US008031487B2

(12) United States Patent
Ostmeier

(10) Patent No.: US 8,031,487 B2
(45) Date of Patent: Oct. 4, 2011

(54) TERMINAL BLOCK AS PART OF A HIGH-VOLTAGE PLANT

(76) Inventor: Hubert Ostmeier, Bonn (DE)

(*) Notice: Subject to any disclaimer, the term of this patent is extended or adjusted under 35 U.S.C. 154(b) by 275 days.

(21) Appl. No.: 12/288,541

(22) Filed: Oct. 20, 2008

(65) Prior Publication Data

US 2010/0046195 A1 Feb. 25, 2010

(30) Foreign Application Priority Data

Aug. 23, 2008 (EP) .................................... 08014950

(51) Int. Cl.
*H02B 1/00* (2006.01)

(52) U.S. Cl. ......................... 361/823; 361/824; 439/626

(58) Field of Classification Search .................. 361/823, 361/824, 835, 837; 439/625, 626
See application file for complete search history.

(56) References Cited

U.S. PATENT DOCUMENTS 1,537,081 A * 5/1925 Graham ........................ 379/328
3,936,133 A * 2/1976 Splitt et al. ...................... 439/54
5,999,394 A * 12/1999 Dias .............................. 361/119
6,111,758 A * 8/2000 Dowd ........................... 361/760
6,456,479 B1 * 9/2002 Dias .............................. 361/119
6,520,780 B2 * 2/2003 Chemin ....................... 439/76.2

FOREIGN PATENT DOCUMENTS

DE PA29236015559 5/1959
DE 1 798 757 10/1959
DE 102 16 913 5/2003
DE 10 2005 025 108 7/2006
EP 0 386 742 9/1990

* cited by examiner

*Primary Examiner* — Dameon Levi
(74) *Attorney, Agent, or Firm* — Thomas R. Vigil

(57) ABSTRACT

The subject matter of the invention is a terminal block (1) as part of a high or mean voltage plant with at least one converter and at least one transformer, said terminal block (1) comprising several terminal ports (5, 6) disposed side by side, each terminal port (5) having two contacting terminal tongues (5*a*), an electric circuit being closed by the contacting terminal tongues (5*a*), there being provided a plug (20) that comprises at least one electrically non conductive plug tongue (22) for disconnecting said terminal tongues (5*a*) in one terminal port (5) in order to open an electric circuit.

9 Claims, 3 Drawing Sheets

TERMINAL BLOCK AS PART OF A HIGH-VOLTAGE PLANT

CROSS-REFERENCE TO RELATED APPLICATIONS

This application claims Priority from European Application No. EP 08014950.3 filed on 23 Aug. 2008

1. Field of the Invention

The present invention relates to a terminal block as part of a high-voltage plant with at least one converter and at least one transformer, said terminal block comprising several terminal ports disposed side by side, each terminal port having two contacting terminal tongues, an electric circuit being closed by the contacting terminal tongues.

2. Description of the Prior Art

A connector block for an electric current meter is known from DE 102 16 913 A1, connecting clamp elements intended to be plugged onto the electric current meter being provided. As a result, it is possible to change a meter without interrupting the electric current supply by plugging a bridging plug onto the connector block.

The document EP 0 386 742 A1 shows a plug with different ports for corresponding terminal tongues, said plug accordingly performing the function of plug coding.

The document DE 1798757 U1 describes a terminal tongue in the form of a flat-cable plug that consists of two metal lamellae that are insulated from each other and that separates their contacts when being plugged into a socket.

A high-voltage plant is understood to refer e.g., to 110 kV plants in an electrical substation. With such a 110 kV plant, the electric current supply occurs via corresponding 110 kV lines. Upon failure of one phase of such a 110 kV line, the line must be completely switched off. For this purpose, relays, so-called mains protection relays, are used to enable corresponding switches which then completely separate such a line from the mains in the electrical substation. The operability of these relays must be tested at certain time intervals. However, such mains protection relays are not the only ones that are being tested, also tested are generally generator protecting devices or meters also. Such type measuring, protecting and metering devices, which will be referred to herein after as electrical devices, are connected to the high-voltage line by so-called converters or also transformers. The same applies in analogous fashion to mean voltage plants.

A terminal block intended for connection to electrical devices is known from DE 10 2005 025 108 B3, said terminal block comprising several terminal ports disposed one behind the other, each terminal port serving to receive a terminal tongue of a plug. The terminal tongue of a plug hereby has one electrically conducting lamella on either side so that a testing or measuring device for checking e.g., a mains protection relay in a high- or mean voltage plant can be connected to the plug. This means that the electric device is disconnected from the plant through the plug without the electric device having to be disconnected. This also means that according to prior art the plant can remain in operation is since electric circuits coming in from the current converter are short-circuited by the plugs and since all the other circuits, such as voltage converter circuits, enabling circuits, signalling circuits and so on are disconnected so that the high or mean voltage plants need not be generally switched off.

From the prior art according to DE 10 2005 025 108 B3 there is further known that the terminal ports are encrypted or encoded with respect to each other. This means that the plugs are only allowed to be pushed into the corresponding terminal ports in a certain order. This further means that there exists a whole number of plugs an inspection engineer must carry with him in order to inspect such a plant or individual circuits. Even if only one electric device and only some few electric circuits must be tested, all of the electric current circuits must be disconnected for safety reasons.

Circuit arrays are further known in the art wherein one unit comprises several switches that are arranged in a side-by-side relationship and that open or close the electric circuit when they are turned over. A great disadvantage of these switches is that they have no finger barrier. So-called test plugs, which comprise connectors for connecting test appliances, may then be attached to these switch units.

In summary, this means that, according to prior art according to DE 10 2005 025 108 B3, the inspection engineer must carry with him a whole series of plugs if he wants to check the operational safety of certain electrical devices in a plant. However, if only some few electrical devices need to be checked, it is not absolutely necessary to bring along such a plurality of plugs. Often enough, the engineer also simply forgets plugs.

The further prior art, which—as described—relates to the turn-over switches, causes big safety problems since the switches have no finger barrier.

BRIEF SUMMARY OF THE INVENTION

Accordingly, the object underlying the invention consists in simplifying manipulation of individual electric circuits such as a mains protection relay or a converter current circuit when inspecting the electrical device.

In accordance with a first embodiment, the object is solved in that there is provided a plug that comprises at least one electrically non conductive plug tongue for disconnecting the terminal tongues of at least one terminal port in order to open the electric circuit. These electrically non conductive plugs are advantageously disposed in the corresponding plug seats of the terminal block for them to be directly accessible by the inspection engineer if the need arises. This however also means that, if only one or two electrical devices need to be inspected, the inspection engineer only needs to take with him the corresponding plugs and that he can for the rest use the plugs for opening the electric circuits that are stored directly in the terminal block in the form of electrically non conductive plugs.

According to another variant, there is provided that, on a plug having two plug tongues, the electric circuit is short-circuited by the plug tongues upon insertion into the two terminal ports. In particular with converter current circuits it is necessary to short-circuit them by opening, which means that the two terminal tongues of such a plug have on one side a conductive lamella for short-circuiting the converter current circuits, the two lamellae being joined together in the region of the plug in order to achieve the short-circuit. These plugs are also disposed for storage in corresponding plug seats in the terminal block. What matters hereby is that the plugs that do not serve to short-circuit the converter current circuits comprise another coding than the plugs for the converter current circuits for them not to be interchangeable. The plugs are however interchangeable among themselves, i.e., the one-pole plugs with one tongue are interchangeable and the plugs for the converter circuits are also interchangeable.

It has been found particularly advantageous that the terminal block comprises a cover for closing the terminal ports. Formerly, the terminal blocks were often accommodated in closable cabinets. More recently, the terminal blocks are located outside so that they are subject to dirt and in particular to dust. Accordingly, there is provided a cover that prevents dust from penetrating into the terminal ports. The cover itself is advantageously slidably received by the terminal block, the plugs comprising plug heads in accordance with a particularly advantageous feature, said plug head having a slot for the cover, which can be pushed therein, to engage, thus securing the plugs against falling out.

The invention will be discussed in closer detail herein after with reference to the drawings.

DETAILED DESCRIPTION OF THE INVENTION

Figure 1:
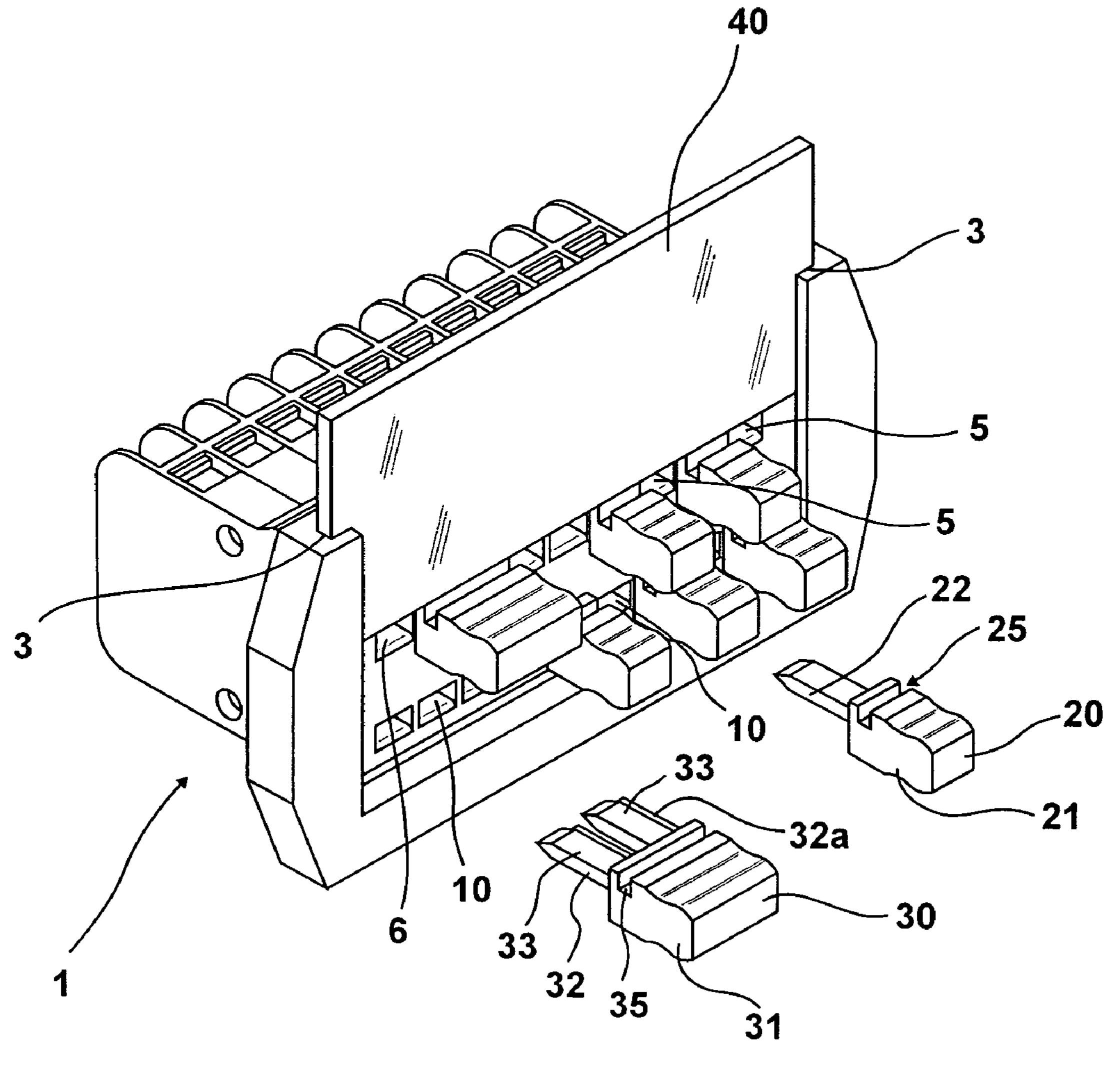
FIG. 1 shows a perspective view of a terminal block with the cover being open in parts.

The terminal block indicated at 1 in FIG. 1 incorporates several terminal block modules 1*a* and comprises several terminal ports 5 disposed in a side-by-side relationship as well as, parallel thereto, plug seats 10 disposed in the terminal block. Both the terminal ports and the plug seats serve for receiving the plugs 20, 30. The plugs 20 incorporate a plug head 21 and a plug tongue 22. The plug tongue 22 is made from electrically non conductive material and ensures, upon insertion into the terminal port 5, that the terminal tongues 5*a* of a terminal block module 1*a* are pushed apart so that the electric circuit is opened (FIG. 3) against the force of the springs 5*b* in the terminal block module. The plugs 30, which serve to short-circuit electric converter circuits, differ from the plugs 20. The terminal plug 30 also has a terminal plug head 31 as well as two plug tongues 32, each plug tongue having a conductive lamella 33 on the one side, said lamellae being joined together in an electrically conductive manner in the region of the plug head in order to allow for short-circuiting the electric converter circuits after insertion in the corresponding terminal ports. The tongues 32 of the plug 30 have on the side one coding block 32*a*, which makes the plug tongues 33 different from the plug tongues 22 of the plug 20. Insofar, the plugs 20, 30 are not interchangeable.

Figure 2:
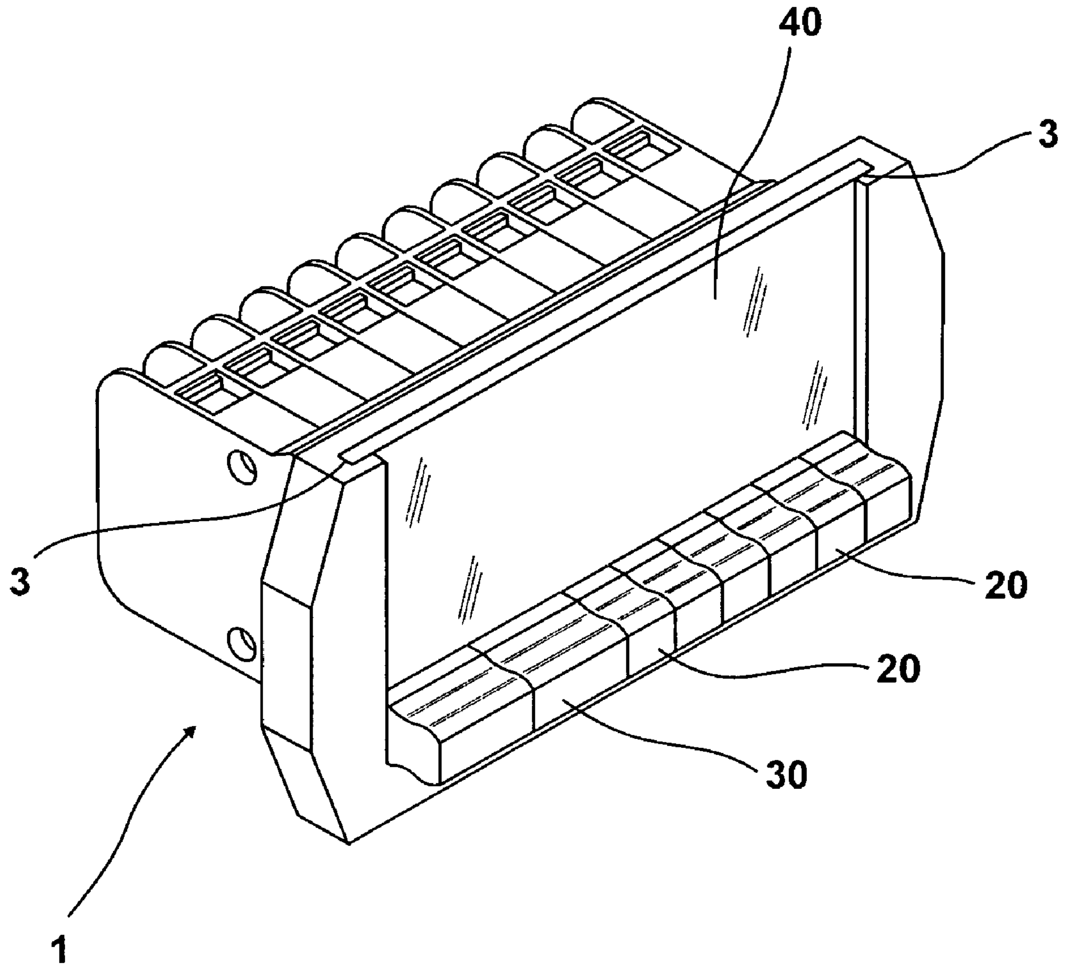
FIG. 2 shows a terminal block according to FIG. 1 with the cover being closed.
Figure 3:
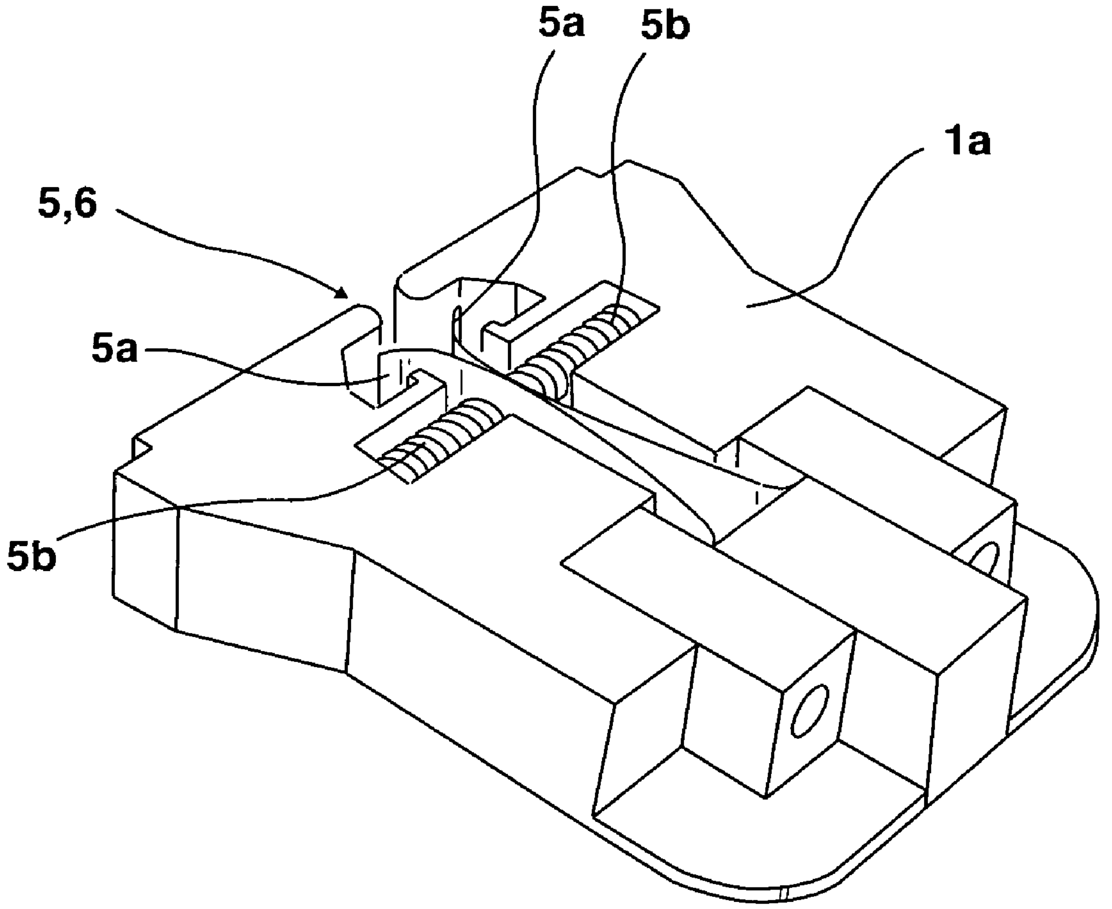
FIG. 3 shows by way of example a terminal block module, several such terminal block modules forming the terminal block.

In the region of the plug heads 20, 30, there are provided slots 25, 35 which serve for the cover 40 to engage, as this can be seen from FIG. 1 but also from FIG. 3, this being shown in FIG. 1 but also in FIG. 2. The cover 40 is slidably received by the terminal block 1, namely through the lateral guides 3 in the terminal block.

I claim:

1. A terminal block as part of a high or mean voltage plant with at least one converter and at least one transformer, said terminal block comprising several terminal ports disposed side by side, each terminal port having two contacting terminal tongues, an electric circuit being closed by the contacting terminal tongues, characterized in that there is provided a plug that comprises at least one electrically non conductive plug tongue for disconnecting said terminal tongues in one terminal port in order to open an electric circuit, said plugs comprise plug heads, and said plug head comprising a slot for engagement of a slidable cover therein.

2. A terminal block as part of a high or mean voltage plant with at least one converter and at least one transformer, said terminal block comprising several terminal ports disposed side by side, each terminal port having two contacting terminal tongues, an electric circuit being closed by the contacting terminal tongues, characterized in that on a plug having two plug tongues, the electric circuit, in particular the electric converter circuit, is short-circuited by the plug tongues upon insertion into the two terminal ports, said plugs comprise plug heads, and said plug head comprising a slot for engagement of a slidable cover therein.

3. The terminal block as part of a high voltage plant as set forth in claim 2, characterized in that the plug tongues connect two terminal tongues of two terminal ports for electrically conductive connection.

4. The terminal block as part of a high voltage plant as set forth in claim 1, characterized in that the terminal ports and are encoded with respect to each other.

5. The terminal block as part of a high voltage plant as set forth in claim 1, characterized in that the terminal block comprises a number of plug seats for the plugs that corresponds to the number of terminal ports.

6. The terminal block as part of a high voltage plant as set forth in claim 1, characterized in that the terminal block comprises a cover for closing the terminal ports.

7. The terminal block as part of a high voltage plant as set forth in claim 6, characterized in that the cover is slidably receivable by said terminal block.

8. A terminal block as part of a high or mean voltage plant with at least one converter and at least one transformer, said terminal block comprising several terminal ports disposed side by side, each terminal port having two contacting terminal tongues, an electric circuit being closed by the contacting terminal tongues,characterized in that there is provided a plug that comprises at least one electrically non conductive plug tongue for disconnecting said terminal tongues in one terminal port in order to open an electric circuit and characterized in that on a plug having two plug tongues, the electric circuit, in particular the electric converter circuit, is short-circuited by the plug tongues upon insertion into the two terminal ports, and said tongues of the plug have on the side one coding block, which makes the plug tongues different from the plug tongues of the plug and said plugs are not interchangeable.

9. The terminal block as part of a high voltage plant as set forth in claim 8, characterized in that the plugs comprise plug heads, said plug head comprising a slot for engagement of the slidable cover therein.

* * * * *

UNITED STATES PATENT AND TRADEMARK OFFICE

CERTIFICATE OF CORRECTION

PATENT NO. : 8,031,487 B2
APPLICATION NO. : 12/288541
DATED : October 4, 2011
INVENTOR(S) : Hubert Ostemeier It is certified that error appears in the above-identified patent and that said Letters Patent is hereby corrected as shown below:

Title Page: Change:

"(76) Inventor: Hubert Ostmeier, Bonn (DE)"

to:
--(76) Inventor: Hubert Ostemeier, Bonn (DE)--

Signed and Sealed this
Twentieth Day of March, 2012

David J. Kappos
*Director of the United States Patent and Trademark Office*